(12) United States Patent
Kim et al.

(10) Patent No.: US 8,128,844 B2
(45) Date of Patent: Mar. 6, 2012

(54) ELECTROCONDUCTIVE THERMOPLASTIC RESIN COMPOSITION AND PLASTIC ARTICLE INCLUDING THE SAME

(75) Inventors: Byeong Yeol Kim, Uiwang-si (KR); Young Sil Lee, Uiwang-si (KR); Young Kyu Chang, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 231 days.

(21) Appl. No.: 12/492,403

(22) Filed: Jun. 26, 2009

(65) Prior Publication Data

US 2009/0261303 A1  Oct. 22, 2009

Related U.S. Application Data

(63) Continuation-in-part of application No. PCT/KR2006/005857, filed on Dec. 28, 2006.

(30) Foreign Application Priority Data

Dec. 26, 2006 (KR) .................. 10-2006-0133541

(51) Int. Cl.
*H01B 1/24* (2006.01)
(52) U.S. Cl. ........ 252/511; 252/510; 252/508; 252/506; 252/509
(58) Field of Classification Search .................. 252/511, 252/510, 508, 506, 509
See application file for complete search history.

(56) References Cited

U.S. PATENT DOCUMENTS

| 7,226,989 | B2 | 6/2007 | Silvi et al. | |
| 7,309,727 | B2 | 12/2007 | Elkovitch et al. | |
| 7,928,156 | B2 * | 4/2011 | Berzinis | 524/445 |
| 2004/0144963 | A1 | 7/2004 | Braig et al. | |
| 2005/0234219 | A1 | 10/2005 | Silvi et al. | |
| 2006/0135636 | A1 * | 6/2006 | Zhu et al. | 521/172 |
| 2006/0142455 | A1 | 6/2006 | Agarwal et al. | |
| 2006/0235113 | A1 | 10/2006 | Dorgan et al. | |
| 2008/0188604 | A1 * | 8/2008 | Cogen et al. | 524/425 |
| 2008/0230251 | A1 * | 9/2008 | Lin et al. | 174/102 R |
| 2009/0326134 | A1 * | 12/2009 | Berzinis | 524/445 |

FOREIGN PATENT DOCUMENTS

| KR | 10-2006-0052657 A | 5/2006 |
| KR | 10-2006-0120023 A | 11/2006 |
| WO | 2008/078850 A1 | 7/2008 |
| WO | WO 2008078850 A1 * | 7/2008 |

OTHER PUBLICATIONS

International Search Report in counterpart International Application No. PCT/KR2006/005857, mailed Aug. 23, 2007.

* cited by examiner

*Primary Examiner* — Douglas McGinty
(74) *Attorney, Agent, or Firm* — Summa, Additon & Ashe, P.A.

(57) ABSTRACT

Disclosed herein are an electrically conductive thermoplastic resin composition and a plastic article. The electrically conductive thermoplastic resin composition comprises about 80 to about 99% by weight of a thermoplastic resin, about 0.1 to about 10% by weight of carbon nanotubes and about 0.1 to about 10% by weight of an organo nanoclay.

14 Claims, No Drawings

ELECTROCONDUCTIVE THERMOPLASTIC RESIN COMPOSITION AND PLASTIC ARTICLE INCLUDING THE SAME

CROSS-REFERENCE TO RELATED APPLICATIONS

This non-provisional application is a continuation-in-part application of PCT Application No. PCT/KR2006/005857, filed Dec. 28, 2006, pending, which designates the U.S. and which is hereby incorporated by reference in its entirety, and claims priority therefrom under 35 USC Section 120. This application also claims priority under 35 USC Section 119 from Korean Patent Application No. 10-2006-0133541, filed Dec. 26, 2006, the entire disclosure of which is also hereby incorporated by reference.

FIELD OF THE INVENTION

The present invention relates to an electrically conductive thermoplastic resin composition and a plastic article formed of the same.

BACKGROUND OF THE INVENTION

Thermoplastic resins are plastics which are softened and plasticized by heating and are hardened by cooling. Thermoplastic resins are divided into: common plastics such as polyethylene, polypropylene, acrylic, styrene, and vinyl resins; and engineering plastics such as polycarbonate, polyphenylene ether, polyamide, polyester, and polyimide resins.

Thermoplastic resins are widely utilized in numerous applications, including various household supplies, office automation equipment, and electric and electrical appliances, owing to their superior processability and formability. There has been a continuous attempt to use a thermoplastic resin as a high value-added material by imparting specific properties as well as superior processability and formability to the thermoplastic resin, according to the kind and properties of products in which the thermoplastic resin is used. In particular, there have been various attempts to impart electrical conductivity to a thermoplastic resin and utilize the electrically conductive thermoplastic resin in the manufacture of automobiles, electric apparatuses, electronic assemblies, and electrical cables with electromagnetic wave shielding performance.

Electrically conductive thermoplastic resin is conventionally prepared from an electrically conductive thermoplastic resin composition obtained by mixing a thermoplastic resin with a conductive additive, such as a carbon black, a carbon fiber, a metallic powder, a metal-coated inorganic powder or a metallic fiber. To ensure a desired level of electrical conductivity of the electrically conductive thermoplastic resin, the conductive additive must be used in significantly large amounts. However, the use of the conductive additive in significantly large amounts can deteriorate impact resistance, which is one of the basic mechanical properties of the thermoplastic resin.

In addition, there have also been efforts to impart superior electrical conductivity to a thermoplastic resin using carbon nanotubes as a conductive additive.

However, when an electrically conductive thermoplastic resin is prepared by mixing a thermoplastic resin with carbon nanotubes and injecting the composite resin mixture using injection molding equipment, the carbon nanotubes may aggregate or unexpectedly orient due to shearing stress occurring during the injection. As a result, the carbon nanotubes contained in the electrically conductive thermoplastic resin are not well dispersed, thus making it difficult to ensure sufficient electrical conductivity of the thermoplastic resin.

SUMMARY OF THE INVENTION

The present invention provides an electrically conductive thermoplastic resin composition with improved electrical conductivity and a plastic article including the same.

In accordance with one aspect of the present invention, there is provided an electrically conductive thermoplastic resin composition comprising: about 80 to about 99% by weight of a thermoplastic resin; about 0.1 to about 10% by weight of carbon nanotubes; and about 0.1 to about 10% by weight of an organo nanoclay, each based on the total weight of the electrically conductive thermoplastic resin composition.

In the electrically conductive thermoplastic resin composition, the thermoplastic resin may be polyacetal, acrylic resin, polycarbonate, styrenic resin, polyester, vinyl resin, polyphenylene ether, polyolefin, acrylonitrile-butadiene-styrene copolymer, polyarylate, polyamide, polyamide imide, polyarylsulfone, polyether imide, polyethersulfone, polyphenylene sulfide, polyvinylidene fluoride resin, polyimide, polyetherketone, polybenzoxazole, polyoxadiazole, polybenzothiazole, polybenzimidazole, polypyridine, polytriazole, polypyrrolidine, polydibenzofuran, polysulfone, polyurea, polyphosphazene, liquid crystal polymer resins, copolymers thereof, or combinations thereof.

The thermoplastic resin may include a polycarbonate resin, and the polycarbonate resin may be an aromatic polycarbonate resin, which can be prepared by reacting phosgene, halogen formate or diester carbonate with a diphenol compound represented by Formula 1 below:

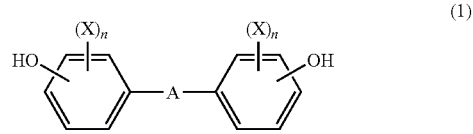

(1)

wherein A represents a single bond, $C_1$-$C_5$ alkylene, $C_1$-$C_5$ alkylidene, $C_5$-$C_6$ cycloalkylidene, —S— or —$SO_2$—; X is halogen; and n is 0, 1 or 2.

The thermoplastic resin may include a polycarbonate resin having a weight average molecular weight of about 10,000 to about 200,000 g/mol.

In the electrically conductive thermoplastic resin, the carbon nanotubes may be single-walled carbon nanotubes, double-walled carbon nanotubes, multi-walled carbon nanotubes, or a combination thereof.

The carbon nanotubes may have a diameter of about 1 to about 50 nm and a length of about 0.01 to about 10 μm.

The carbon nanotubes may have an aspect ratio of about 100 to about 1,000.

In the electrically conductive thermoplastic resin, the organo nanoclay may be an organic-modified layered silicate having a distance between adjacent layers of about 9 to about 14 Å.

The layered silicate may be montmorillonite, hectorite, bentonite, saponite, magadiite, synthetic mica, or a combination thereof.

The organo nanoclay may be a layered silicate which is organically-modified with an organic phosphate or ammonium salt substituted with a $C_{12}$-$C_{36}$ alkyl group or a $C_5$-$C_{30}$ aromatic group.

In accordance with another aspect of the present invention, there is provided a plastic article produced from the electrically conductive thermoplastic resin composition.

In accordance with yet another aspect of the present invention, there is provided a plastic article comprising: a thermoplastic resin; and carbon nanotubes and an organo nanoclay dispersed in the thermoplastic resin.

Details of other aspects and exemplary embodiments of the present invention are encompassed in the following detailed description.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

According to one embodiment of the present invention, there is provided an electrically conductive thermoplastic resin composition comprising: about 80 to about 99% by weight of a thermoplastic resin; about 0.1 to about 10% by weight of carbon nanotubes; and about 0.1 to about 10% by weight of an organo nanoclay, each based on the total weight of the electrically conductive thermoplastic resin composition.

As described above, the electrically conductive thermoplastic resin composition comprises organo nanoclay, in addition to carbon nanotubes. Accordingly, during injection or extrusion molding of the resin composition, the organo nanoclay prevents the carbon nanotubes from being unexpectedly oriented and enables the carbon nanotubes to be uniformly dispersed in the thermoplastic resin. Thus, even when only a small amount of the carbon nanotubes is used as an additive, the carbon nanotubes can impart considerable electrical conductivity to the thermoplastic resin after injecting or extruding. In addition, the relatively reduced content of carbon nanotubes can inhibit deterioration of the basic mechanical properties of the thermoplastic resin caused by the inclusion of excessive carbon nanotubes.

Hereinafter, each constituent component of the electrically conductive thermoplastic resin composition will be described in detail.

The electrically conductive thermoplastic resin composition comprises about 80 to about 99% by weight of a thermoplastic resin.

Any thermoplastic resin including any common and engineering plastics may be used without any particular limitation so long as the resin can be used in extrusion or injection molding.

Examples of the thermoplastic resin include without limitation polyacetal, acrylic resin, polycarbonate, styrenic resin, polyester, vinyl resin, polyphenylene ether, polyolefin, acrylonitrile-butadiene-styrene copolymer, polyarylate, polyamide, polyamide imide, polyarylsulfone, polyether imide, polyethersulfone, polyphenylene sulfide, polyvinylidene fluoride resin, polyimide, polyetherketone, polybenzoxazole, polyoxadiazole, polybenzothiazole, polybenzimidazole, polypyridine, polytriazole, polypyrrolidine, polydibenzofuran, polysulfone, polyurea, polyphosphazene, and liquid crystal polymer resins. In addition, the thermoplastic resin may be used as a copolymer or combination thereof.

Depending on the physical properties of the electrically conductive thermoplastic resin composition or the type of product with which it is used, the thermoplastic resin can include, but is not limited to: polyolefin resins such as polyethylene, polypropylene, ethylene-vinyl acetate copolymer and ethylene-methyl methacrylate copolymer resins; styrenic resins; and engineering plastics selected from polyamide, polyester (e.g., polyethylene terephthalate and polybutylene terephthalate), polycarbonate resins; and copolymers and combinations thereof.

A more detailed description of exemplary polycarbonate, polyester and polyamide resins suitable as the thermoplastic resin will be given hereinafter.

First, polyamide resin may be used as the thermoplastic resin.

The polyamide resin may be a common polyamide resin well-known in the art. More specifically, the polyamide resin may be a nylon resin selected from polycaprolactam (nylon 6), poly (11-aminoundecanoic acid) (nylon 11), poly lauryl-lactam (nylon 12), polyhexamethylene adipamide (nylon 6,6), polyhexaethylene azelamide (nylon 6,9), polyhexaethylene sebacamide (nylon 6,10), polyhexaethylene dodecanediamide (nylon 6,12), and the like, and combinations thereof. In addition, the polyamide resin may be used as a copolymer thereof, e.g., nylon 6/6,10, nylon 6/6,6, nylon 6/6,12, and the like, and combinations thereof. In addition, combinations of the polyamide resin and/or copolymers thereof may also be used.

The polyamide resin may have a relative viscosity of about 2.4 to about 3.5 and a weight average molecular weight of about 20,000 to about 100,000 g/mol. The polyamide resin can be prepared in accordance with any method well-known to those skilled in the art and is also commercially available. Exemplary commercially available polyamide resins include, but are not limited to, KN-120® (available from Kolon Industries, Inc.) and 1021® (available from Rhodia Inc.)

Second, polyester resin may be used as the thermoplastic resin.

The polyester resin may contain an ester linkage in a polymer chain and be melted by heating. The polyester resin may be prepared by polycondensation of dicarboxylic acid and a dihydroxy compound. There is no limitation as to the preparation method of the polyester resin. Accordingly, any polyester resin prepared using any method well-known to those skilled in the art may be used in the present invention. In addition, any polyester resin, such as a homopolyester or copolyester resin, as well as combinations thereof, may be used without any particular limitation.

Third, polycarbonate resin may be used as the thermoplastic resin.

Examples of the polycarbonate resin may include without limitation aromatic polycarbonate resins, which can be prepared by reacting phosgene, halogen formate, or diester carbonate with a diphenol compound represented by Formula 1 below:

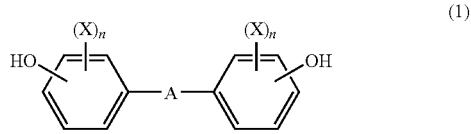

(1)

wherein A represents a single bond, $C_1$-$C_5$ alkylene, $C_1$-$C_5$ alkylidene, $C_5$-$C_6$ cycloalkylidene, —S— or —$SO_2$—; X is halogen; and n is 0, 1 or 2.

Examples of the diphenol compounds of Formula 1 include without limitation hydroquinone, resorcinol, 4,4'-dihydroxydiphenyl, 2,2-bis-(4-hydroxyphenyl)-propane (also referred to as "bisphenol-A" or "BPA"), 2,4-bis-(4-hydroxyphenyl)-2-methylbutane, 2,2-bis-(3-chrolo-4-hydroxyphenyl)-propane, 2,2-bis-(3,5-dichrolo-4-hydroxyphenyl)-propane, 1,1-bis-(4-hydroxyphenyl)-cyclohexane, and the like, and combinations thereof.

The polycarbonate resin can have a weight average molecular weight of about 10,000 to about 200,000 g/mol, for example about 15,000 to about 80,000 g/mol.

There is no limitation as to the type of the polycarbonate resin. For example, the polycarbonate resin may be a linear or branched polycarbonate resin, a polyester-carbonate copolymer resin, or a combination thereof. The branched polycarbonate resin may be prepared by using about 0.05 to about 2 mol % of a tri- or higher functional (i.e., polyfunctional) compound, e.g., a tri- or higher functional phenol compound, based on the total moles of the diphenol compound. The polyester-carbonate copolymer resin may be prepared by polymerizing polycarbonate in the presence of an ester precursor, such as dicarboxylic acid.

Also, a homopolycarbonate, copolycarbonate resin, or a combination thereof may also be used as the polycarbonate resin without any particular limitation.

As mentioned above, suitable examples of the thermoplastic resin include, but are not limited to, polycarbonate, polyester, and polyamide resins, and combinations thereof. The composition and preparation method of each thermoplastic resin are already well-known to those skilled in the art.

The electrically conductive thermoplastic resin composition may further comprise carbon nanotubes. The carbon nanotubes exhibit superior mechanical strength, high initial Young's modulus, and a large aspect ratio based on their inherent structural characteristics. In addition, the carbon nanotubes have superior electrical conductivity and thermal conductivity, as compared to copper and gold, which is disclosed in Yakobson, B. I., et al., American Scientist, 85, (1997), 324-337; and Dresselhaus, M. S., et al., Science of Fullerenes and Carbon Nanotubes, (1996), San Diego, Academic Press, 902-905. Also, the carbon nanotubes have a tensile strength of about 100 times as large as that of steel and a weight of one sixth as small as that thereof, which is disclosed in Andrew R., et al., Macromol. Mater. Eng., 287, (2002), 395-403; and Kashiwagi T., et al., Macromol. Rapid Commun., 4, (2002), 761-765. Based on the inherent characteristics of the carbon nanotubes, even a small amount of the carbon nanotubes contained in the thermoplastic resin composition can impart superior electrical conductivity to the thermoplastic resin.

Carbon nanotubes have a structure in which carbon atoms are arranged in a predetermined configuration to form an empty tube.

Carbon nanotubes are divided into single-walled carbon nanotubes, double-walled carbon nanotubes and multi-walled carbon nanotubes, based on the wall number thereof. Any carbon nanotubes may be utilized in the electrically conductive thermoplastic resin composition without any particular limitation.

Carbon nanotubes have a circumference of an atomic scale and a diameter of several nanometers (nm) to several tens of nanometers (nm). For example, single-walled carbon nanotubes have a diameter of about 0.4 to about 100 nm, for example about 0.7 to about 5 nm.

Carbon nanotubes useful in the present invention may have a diameter of about 1 to about 50 nm, for example about 1 to about 20 nm, and a length of about 0.01 to about 10 μm, for example about 1 to about 10 μM. Based on the diameter and length, the carbon nanotubes may have an aspect ratio (L/D) of about 100 or more, for example about 100 to about 1,000.

The nano-scale diameter of carbon nanotubes puts restrictions on electron motion in the circumference direction, thus causing a so-called "low-dimensional quantum phenomenon". Such a low-dimensional quantum phenomenon may be greatly varied depending upon the rolled type of carbon nanotubes. For this reason, carbon nanotubes can exhibit superior electrical conductivity compared(able) to metals or semiconductors. Accordingly, the carbon nanotubes contained in the electrically conductive thermoplastic resin composition can impart electrical conductivity to the thermoplastic resin.

Carbon nanotubes can be synthesized by arc-discharge, pyrolysis, laser ablation, plasma enhanced chemical vapor deposition (PECVD), thermal chemical vapor deposition, electrolysis, or flame synthesis. However, there is no limitation as to the synthesis method of the carbon nanotubes. Accordingly, carbon nanotubes synthesized by employing any method may be used for the electrically conductive thermoplastic resin composition without any particular limitation.

The electrically conductive thermoplastic resin composition can include the carbon nanotubes in an amount of about 0.1 to about 10% by weight, for example about 1 to about 5% by weight. The content of carbon nanotubes ensures an adequate balance of mechanical properties and thermal conductivity of the thermoplastic resin. An amount of carbon nanotubes less than about 0.1% by weight can make it difficult to ensure that the thermoplastic resin prepared from the electrically conductive resin composition has the desired level of electrical conductivity. An amount of carbon nanotubes exceeding about 10% by weight may cause deterioration in mechanical properties of the thermoplastic resin.

The electrically conductive thermoplastic resin composition comprises organo nanoclay, in addition to the thermoplastic resin and the carbon nanotubes. The organo nanoclay indicates an organic-modified layered silicate.

The organo nanoclay contained in the thermoplastic resin composition can minimize or prevent the tendency of the carbon nanotubes to aggregate or unexpectedly orient and can enable the carbon nanotubes to be uniformly dispersed in the thermoplastic resin, during injection molding or extrusion. Accordingly, the organo nanoclay can interact with carbon nanotubes, thus improving thermal conductivity of the thermoplastic resin. As a result, even a small amount of the carbon nanotubes can impart considerable electrical conductivity to the thermoplastic resin.

The electrically conductive thermoplastic resin composition comprises not conventional nanoclay, but organo nanoclay, i.e., an organic-modified layered silicate. Since nano-scale layered silicate is basically hydrophilic, it is non-miscible with a hydrophobic polymer, e.g., a thermoplastic resin, thus undergoing a reduction in dispersibility. Accordingly, organic-modification imparts hydrophobicity to the nano-scale layered silicate, thereby improving not only an intercalation capability of the silicate in a polymer chain, but dispersibility thereof in the thermoplastic resin. Hence, the organic-modified layered silicate can be uniformly dispersed, thereby obtaining the desired level of physical properties (e.g., electrical conductivity) of the thermoplastic resin.

Organo nanoclay is typically prepared by organically-modifying a nano-scale layered silicate having the distance between adjacent layers of about 9 to about 14 Å. The layered silicate can have an average diameter of about 50 μM or less, for example about 25 μM or less, and as another example about 10 μM or less. The layered silicate, which satisfies these requirements and is thus suitable for use in the organo nanoclay, can be selected from montmorillonite, hectorite, bentonite, saponite, magadiite, synthetic mica, and the like, and combinations thereof.

Alternatively, the organo nanoclay can be prepared by organically modifying a layered silicate with an organic phosphate or ammonium salt substituted with a $C_{12}$-$C_{36}$ alkyl group or a $C_5$-$C_{30}$ aromatic group. Furthermore, the organo nanoclay can be prepared by organically modifying montmorillonite with an organic phosphate or ammonium salt substituted with a $C_{12}$-$C_{36}$ alkyl group or a $C_5$-$C_{30}$ aromatic group. In this case, the montmorillonite undergoes a change from hydrophilicity to hydrophobicity, thereby promoting uniform dispersion in the thermoplastic resin and optimum physical properties of the resin.

The electrically conductive resin composition includes the organo nanoclay in an amount of about 0.1 to about 10% by weight. The organo nanoclay content can efficiently improve electrical conductivity of the resin, without substantially deteriorating mechanical properties of the resin.

Optionally, the electrically conductive thermoplastic resin composition can further comprise an impact modifier, e.g., a rubbery impact modifier such as a core-shell graft copolymer, a silicone polymer, an olefin polymer, or a combination thereof. When the resin composition includes an impact modifier, rubbery particles can be dispersed in the thermoplastic resin, which can improve the physical properties (e.g., impact resistance) thereof. The specific composition and preparation method of each rubbery impact modifier are already well-known to those skilled in the art. When present, the impact modifier can be used in an amount of about 0.1 to about 20 parts by weight, based on about 100 parts by weight of the thermoplastic resin, carbon nanotubes, and organo nanoclay.

The electrically conductive thermoplastic resin composition may further comprise an additive suitable for a targeted use, in addition to the fore-mentioned constituent components. Examples of the additive include vinyl copolymers, lubricants, release agents, plasticizers, nucleating agents, stabilizers, modifiers, inorganic additives, and the like, and combinations thereof. The additive can be added in an amount of about 30 parts by weight or less, based on about 100 parts by weight of the thermoplastic resin, carbon nanotubes, and organo nanoclay.

The electrically conductive thermoplastic resin can be prepared by conventional methods such as: mixing each constituent component to prepare an electrically conductive thermoplastic resin composition; and melt-extruding the resin composition in an extruder. The electrically conductive thermoplastic resin composition can also be injection molded using methods known in the art. A plastic article is produced from the electrically conductive thermoplastic resin.

According to another embodiment of the present invention, there is provided a plastic article produced from the electrically conductive thermoplastic resin composition. More specifically, the plastic article may comprise a thermoplastic resin matrix, and carbon nanotubes and organo nanoclay, each being dispersed in the thermoplastic resin matrix.

The plastic article can exhibit enhanced electrical conductivity based on the interaction between the carbon nanotubes and the organo nanoclay, which can prevent the carbon nanotubes from being unexpectedly oriented and can improve the degree of dispersion. In particular, the enhanced electrical conductivity may be maintained after the injection molding.

Thus, the use of the carbon nanotubes even in a small amount can impart considerable electrical conductivity to the thermoplastic resin. In addition, the small amount of the carbon nanotubes can inhibit deterioration of the basic mechanical properties of the thermoplastic resin caused by the inclusion of excessive carbon nanotubes.

Accordingly, the plastic article can be widely utilized in a variety of applications, e.g., impartment of electrical conductivity to automobiles, electric apparatuses, electronic assemblies and electrical cables.

The present invention will be better understood from the following examples. However, these examples are not to be construed as limiting the scope of the invention.

Further details for (A) a thermoplastic resin (polycarbonate and polyamide resins), (B) carbon nanotubes, and (C) organo nanoclay used in the following examples and comparative examples are as follows:

(A) Thermoplastic Resin (Polycarbonate Resin)

Bisphenol-A polycarbonate having a weight average molecular weight (Mw) of 25,000 g/mol is used as a polycarbonate resin selected from thermoplastic resins.

(A') Thermoplastic Resin (Polyamide Resin)

KN-120® (available from Kolon Industries, Inc.) is used as a polyamide resin selected from thermoplastic resins.

(B) Carbon Nanotubes

Multi-walled carbon nanotubes (C-tube 100® available from CNT Co., LTD., diameter: 10-50 nm, length: 1-25 μM) are used as carbon nanotubes.

(C) Organo Nanoclay

Cloisite 30B® (available from Southern Clay Products Inc.,) is used as an organo nanoclay.

Examples 1 to 5 and Comparative Examples 1 to 4

The content of each constituent component used in the following Examples 1 to 5 and Comparative Examples 1 to 4 is shown in Table 1. Respective components are mixed in accordance with the composition shown in Table 1, to prepare an electrically conductive thermoplastic resin composition. The composition is extruded in a double-screw extruder (L/D=36, φ=45 mm) and the resulting extrudate is pelletized. The pellets are injected in an injection machine (10 oz) at 270° C. to prepare a sample for measurement of electrical conductivity.

First, the electrical conductivity (surface resistance) of each sample is measured with a surface resistance meter (evaluation for electrical conductivity).

The tensile strength of each sample is measured in accordance with ASTM (American standard test method) D638. At this time, the measurement is based on the conditions of 20 mm/min, the record is made on a unit of kgf/cm² (evaluation for mechanical strength).

The measurement results of the electrical conductivity and tensile strength are shown in Tables 1 below.

TABLE 1

|  | Ex. | | | | | Comp. Ex. | | | |
| --- | --- | --- | --- | --- | --- | --- | --- | --- | --- |
|  | 1 | 2 | 3 | 4 | 5 | 1 | 2 | 3 | 4 |
| (A) polycarbonate resin (wt. %) | 98 | 96 | 95 | 93 | — | 99 | 97 | 97 | — |
| (A') polyamide resin (wt. %) | — | — | — | — | 95 | — | — | — | 97 |
| (B) carbon nanotubes (wt. %) | 1 | 3 | 1 | 3 | 3 | 1 | 3 | — | 3 |
| (C) organo nanoclay (wt. %) | 1 | 1 | 4 | 4 | 2 | — | — | 3 | — |
| Tensile strength (kgf/cm$^2$) | 650 | 680 | 690 | 700 | 868 | 630 | 670 | 680 | 573 |
| Surface resistance (Ω/sq.) | $10^{11}$ | $10^{8}$ | $10^{10}$ | $10^{6}$ | $10^{9}$ | $10^{15}$ | $10^{14}$ | $10^{15}$ | $10^{15}$ |

As can be seen from the data in Table 1, Examples 1 to 5 comprising both carbon nanotubes and organo nanoclay, in addition to the thermoplastic resins (polycarbonate and polyamide resins), exhibit improved electrical conductivity, as compared to Comparative Examples 1 to 4 comprising only one of carbon nanotubes and organo nanoclay, in addition to the thermoplastic resins. In particular, Examples 1 to 2 containing organo nanoclay in an amount of only 1% by weight exhibit improved electrical conductivity, as compared to Comparative Examples 1 to 2 containing no organo nanoclay. Even Example 5, which includes a polyamide resin, exhibits improved electrical conductivity comparable to those of the afore-mentioned cases and as compared with Comparative Example 4, which also includes a polyamide resin. As shown in Comparative Example 1, and Examples 2 and 4, the larger the content of organo nanoclay at a constant amount of carbon nanotubes, the higher the improvement in the electrical conductivity of the sample.

Also, Examples 1 to 5 exhibit high mechanical properties, e.g., tensile strength.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

That which is claimed is:

1. An electrically conductive thermoplastic resin composition comprising:
   about 80 to about 99% by weight of a thermoplastic resin;
   about 0.1 to about 10% by weight of carbon nanotubes; and
   about 0.1 to about 10% by weight of an organo nanoclay,
   wherein the organo nanoclay includes an organic-modified layered silicate having a distance between adjacent layers of 9 Å to 14 Å.

2. The electrically conductive thermoplastic resin composition according to claim 1, wherein the thermoplastic resin comprises polyacetal, acrylic resin, polycarbonate, styrenic resin, polyester, vinyl resin, polyphenylene ether, polyolefin, acrylonitrile-butadiene-styrene copolymer, polyarylate, polyamide, polyamide imide, polyarylsulfone, polyether imide, polyethersulfone, polyphenylene sulfide, polyvinylidene fluoride resin, polyimide, polyetherketone, polybenzoxazole, polyoxadiazole, polybenzothiazole, polybenzimidazole, polypyridine, polytriazole, polypyrrolidine, polydibenzofuran, polysulfone, polyurea, polyphosphazene, liquid crystal polymer resins, a copolymer thereof or a combination thereof.

3. The electrically conductive thermoplastic resin composition according to claim 1, wherein the thermoplastic resin includes a polycarbonate resin.

4. The electrically conductive thermoplastic resin composition according to claim 3, wherein the polycarbonate resin is an aromatic polycarbonate resin prepared by reacting phosgene, halogen formate or diester carbonate with a diphenol compound represented by Formula 1 below:

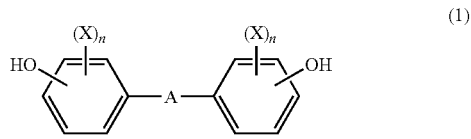

(1)

wherein A represents a single bond, $C_1$-$C_5$ alkylene, $C_1$-$C_5$ alkylidene, $C_5$-$C_6$ cycloalkylidene, —S— or —SO$_2$—;
X is halogen; and n is 0, 1 or 2.

5. The electrically conductive thermoplastic resin composition according to claim 1, wherein the thermoplastic resin includes a polycarbonate resin having a weight average molecular weight of about 10,000 to about 200,000 g/mol.

6. The electrically conductive thermoplastic resin composition according to claim 1, wherein the carbon nanotubes are single-walled carbon nanotubes, double-walled nanotubes, multi-walled carbon nanotubes, or a combination thereof.

7. The electrically conductive thermoplastic resin composition according to claim 1, wherein the carbon nanotubes have a diameter of about 1 to about 50 nm and a length of about 0.01 to about 10 μm.

8. The electrically conductive thermoplastic resin composition according to claim 1, wherein the carbon nanotubes have an aspect ratio of about 100 to about 1,000.

9. A plastic article comprising:
   a thermoplastic resin matrix; and
   carbon nanotubes and an organo nanoclay, each being dispersed in the thermoplastic resin matrix, wherein the organo nanoclay includes an organic-modified layered silicate having a distance between adjacent layers of 9 Å to 14 Å.

10. The electrically conductive thermoplastic resin composition according to claim 1, wherein the layered silicate comprises montmorillonite, hectorite, bentonite, saponite, magadiite, synthetic mica, or a combination thereof.

11. The electrically conductive thermoplastic resin composition according to claim 1, wherein the organo nanoclay includes a layered silicate organic-modified with an organic phosphate or ammonium salt substituted with a $C_{12}$-$C_{36}$ alkyl group or a $C_5$-$C_{30}$ aromatic group.

12. The electrically conductive thermoplastic resin composition according to claim 1, further comprising an impact modifier.

13. The electrically conductive thermoplastic resin composition according to claim 12, comprising the impact modifier in an amount of about 0.1 to about 20 parts by weight, based on about 100 parts by weight of the thermoplastic resin, carbon nanotubes, and organo nanoclay.

14. A plastic article produced from the electrically conductive thermoplastic resin composition according to claim 1.

* * * * *